Jan. 12, 1960  T. C. R. SHEPHERD  2,920,633
VALVES FOR CONTROLLING FLOW OF LIQUIDS
Filed Oct. 11, 1957
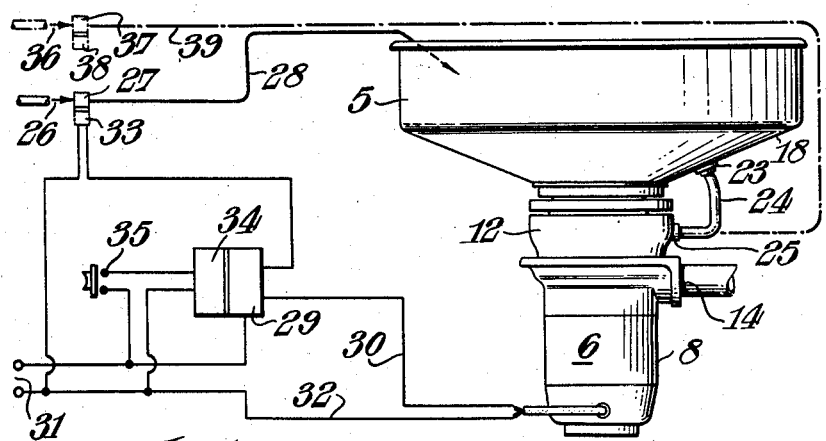
Fig. 1.
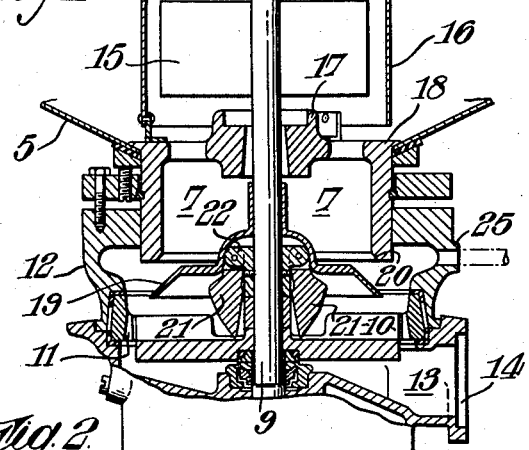
Fig. 2.
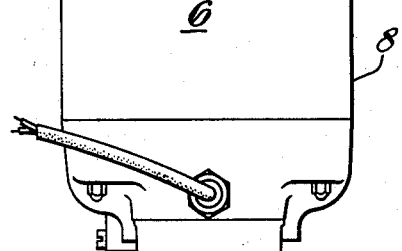
Inventor
Thomas C. R. Shepherd
By Ralph B. Stewart
Attorney United States Patent Office 2,920,633
Patented Jan. 12, 1960

2,920,633

VALVES FOR CONTROLLING FLOW OF LIQUIDS

Thomas C. R. Shepherd, Ross-on-Wye, England

Application October 11, 1957, Serial No. 689,730

Claims priority, application Great Britain
October 15, 1956

6 Claims. (Cl. 134—115)

This invention concerns dish-washing machines and relates to machines comprising a receptacle in which the dishes are washed, a device for circulating water within the receptacle to wash the dishes, an outlet from the receptacle for discharge of waste, a power-driven apparatus which receives waste discharged from the receptacle and which comminutes solid material carried away with the waste and means for driving the water circulator by the comminuting apparatus. It has been proposed to provide a valve to close the outlet so that water can collect in the receptacle for dish washing, the valve being subsequently opened for discharge of waste to the comminuating apparatus. It is desirable that the valve be automatically actuated and, in the prior proposal, this was done by a solenoid device connected to the valve by a linkage passing through a casing of the comminuting apparatus.

According to this invention a dish-washing machine is characterized in that the discharge of waste through the outlet is controlled by a valve and in that there is centrifugally-actuated means for operating the valve, said valve-operating means being driven by the comminuating apparatus and being so arranged that the valve is closed while the water circulator is being driven by the comminuting apparatus. Thus, the actuation of the valve is automatically controlled and is dependent on operation of the water circulator. However, as the valve control is effected centrifugally by means driven by the comminuting apparatus the entire valve mechanism may be housed within the comminuting apparatus and being mechanically operated the valve can be of robust and reliable design.

A feature of this invention is that the water circulator comprises an impeller above the outlet from the receptacle and driven by a shaft from the comminuting apparatus, the valve being slidably mounted on the shaft and being actuated by fly weights carried round with the shaft.

Waste discharges from the receptacle beneath the impeller and the only obstacle to its passage into the comminuting apparatus is the valve. Accordingly relatively large pieces of solid, food waste can be discharged from the receptacle for comminution in said apparatus. Consequently it is unnecessary to scrape large pieces of food waste (e.g. vegetables, bones and so on) from the dishes before they are placed in the dish-washing receptacle.

Yet a further feature of this invention is that the valve comprises a disc having a conical and downwardly-directed marginal portion, the fly weights being below the disc valve and within the conical marginal portion thereof. The comminuting apparatus comprises a ring of teeth and a rotary breaker, within the ring of teeth and co-acting therewith. The disc valve protects the fly weights from the waste discharging through the outlet from the receptacle and the conical portion directs the waste towards the ring of teeth. Thus, the waste is delivered on to the rotary breaker in the region where comminution will occur.

A practical application of the inventions will now be described, by way of example only, with reference to the accompanying drawings wherein:

Fig. 1 is a diagrammatic view illustrating a dish-washing machine and an automatic control for regulating the sequence of operation thereof, and Fig. 2 is an elevation, partly in section, of the dish-washing machine diagrammatically illustrated in Fig. 1.

Referring to the drawings: the dish-washing machine comprises a receptacle 5 within which dishes (supported in racks) are placed to be washed and a comminuting apparatus, generally indicated by the reference numeral 6. The comminuting apparatus 6 is secured beneath the receptacle 5 which has a discharge opening 7 through which waste passes from the receptacle, after a dish-washing operation, into the apparatus 6. The apparatus comprises an electric motor 8 which drives a shaft 9 carrying a pair of rotary breakers 10 which co-act with a ring of teeth 11 carried by the casing 12 of the apparatus. Food carried away with the waste through the opening 7 into casing 12 is comminuted between the teeth 11 and the breaker 10 and falls into a chamber 13 from which it is discharged through a drain outlet 14. The shaft 9 passes upwardly through the opening 7 to within the receptacle 5 and, at its top end, carries an impeller 15 by which water, within the receptacle 5, is circulated to pass around the dishes and wash them. The impeller 15 is surrounded by a guard 16 supported on feet 17 to be slightly above the bottom 18 of the receptacle 5. The guard 16 prevents water circulated by the impeller 15 from being thrown outwards in the receptacle.

The shaft 9 carries a member 19 which co-acts with a seat 20 on the opening 7, member 19 being slidable along the shaft. Fly weights 21 are pivotally carried by a ring 22 secured to the shaft 9 and engage beneath valve members 19 so that when the motor 8 drives the shaft 9 the weights lift the conical valve against seat 20 to close the drain. In other words while the motor 8 is operative (i.e. impeller 15 is being driven) the opening 7 is closed.

The breakers 10 are shown in the same plane as the flyweights 21 in Fig. 2 so that they may both be seen in this figure but in fact the pair of breakers are in a plane at right angles to the flyweights.

The receptacle 5 has an overflow outlet 23 which is connected by a pipe 24 with an inlet 25 in the casing 12 above the ring of teeth 11.

Hot water is supplied by a pipe 26 to a valve 27 which controls delivery of the water, by pipe 28, to the receptacle 5.

The electric motor 8 is connected to switch gear 29 through line 30, the switch gear 29 being connected to one side of the mains supply 31, the other side of the mains being connected to the motor 8 by line 32. Similarly as solenoid device 33 is connnected to the mains 31 through switch gear 29. Switch gear 29 is automatically controlled by a timing mechanism 34, which in the particular arrangement being described is electrically operated, being energized from the mains 31 when a starting button 35 is pressed.

The arrangement described operates as follows:

The dishes are placed in the receptacle 5 and button 35 is pressed. The timing mechanism 34 is started and controls the switch gear 29 so as to energize the solenoid device 33 and simultaneously to start the motor 8. The solenoid device 33 when energized opens the valve 27 so that hot water is supplied to the receptacle 5. When the motor 8 starts the valve 19, 20 closes (since the shaft 9 is then driven) and consequently hot water collects within the receptacle 5. The water in the receptacle is circulated therein by the impeller 15 to wash the dishes. An important feature of this construction is that solid waste food (e. g. vegetables, bones, pieces of fat and so on) on the dishes is not removed before they are placed in the receptacle, the hot water circulating around the dishes washing the food off. As the bottom 18 of receptacle 5 is inclined downwardly from the side walls to the opening 7 the solid waste will gravitate towards the opening.

The washing operation described continues for a certain period at the end of which timer 34 automatically actuates the switch gear 29 to stop the motor 8 and close the valve 27. The time selected is such that the level of water in receptacle 5 does not reach overflow 23. The operation is of short duration since it is intended primarily to remove the larger, solid parts of food sticking to the dishes.

As the motor 8 comes to rest valve 19 opens and the waste from the receptacle 5 is discharged (with the larger parts of food) through opening 7 and into casing 12 of the comminuting apparatus—which at this time is inoperative. Consequently the food waste will lie upon the breaker 10. After a time sufficient for emptying the receptacle 5, the timer 34 automatically adjusts the switch gear 29 to energise the solenoid device 33 and start the motor 8. Consequently hot water is supplied to the receptacle 5 so that the dishes are given a second wash of a more exacting nature than the first operation (being for the greater time) during which the water continues to be supplied to the receptacle 5. As motor 8 starts the valve 19, 20 closes and the hot water collects in the receptacle 5. The time of the second washing operation is selected so that the level of the hot water reaches overflow 23. Hot water is delivered through overflow 23 and pipe 24 to apparatus 6. While the second washing operation is being carried out the food previously delivered to apparatus 6 (which is operative) is being comminuted and the comminuted food is flushed away by water entering the apparatus through inlet 25. At the end of the second washing operation the timer again actuates the switch gear 29 to de-energize the solenoid device 33 and to stop the motor 8 whereupon the waste from the receptacle 5 is drained through the apparatus 6 and discharged from pipe 14. Finally, after a predetermined time sufficient for complete drainage, the timer again sets the switch gear 29 so that hot rinsing water is supplied to the receptacle 5 and the motor 8 is started thereby closing the valve 19. At the end of the rinse period the motor 8 is automatically stopped and the waste from the receptacle 5 drained away. The dishes are then removed from the receptacle 5.

The valve 19 being centrifugally actuated to close by the fly weights 21 which are driven by motor 8 (which also drives impeller 15) ensures that while the impeller is operative for dish washing, the outlet from receptacle 5 is automatically closed so that water may collect in the receptacle to permit the washing operation to be performed.

The valve member 19 (see Fig. 2) has a circumferential marginal portion which is conical and downwardly divergent and there is a central domed portion. The fly weights lie in part within the domed portion and entirely within the marginal portion. The fly weights are thus protected from direct engagement with the waste discharged from the receptacle 5. The conical edge of member 19 is such that it directs waste materials towards the ring of teeth where the material is required for comminution.

The timer 34 is adjustable so that the length of time of the various operations and the interval therebetween may be pre-set and the complete washing cycle will be automatically carried out when button 35 is pressed. When the cycle has been completed the machine will be brought to rest ready for another cycle of operations.

The final rinse water discharged through the apparatus 6 ensures that the apparatus is washed out and is left clean and wholesome.

Instead of supplying water to apparatus 6 through overflow pipe 24 the latter may be replaced by a pipe 39.

Cold water from a pipe 36 is controlled by a valve 37 which is actuated by a solenoid device 38, the cold water being delivered to pipe 39. Device 38 is controlled by switch gear 29 so that when water is required to flush comminuted waste away from apparatus 6 the switch gear 29 energizes the device 38 to open valve 37.

I claim:

1. A dish-washing machine comprising a receptacle in which the dishes are washed, a rotary device within the receptacle for circulating water therein to wash the dishes, a bottom outlet from the receptacle for discharge of waste, a chamber below the dish receptacle which receives waste discharged through the outlet from the receptacle and which houses a comminuting apparatus including a rotary element that comminutes solid material carried away with the waste, a vertical shaft for driving the water circulator and the comminuting element, a valve in the comminuting chamber for controlling the discharge of waste through the outlet, and centrifugally-actuated means for operating the valve, said centrifugally-actuated means being driven by the shaft so that the valve is closed while the water circulator and the comminuting element are being driven by the shaft.

2. A dish-washing machine comprising a receptacle in which the dishes are washed, a rotary device within the receptacle for circulating water therein to wash the dishes, a bottom outlet from the receptacle for discharge of waste, a chamber below the dish receptacle which receives waste discharged from the receptacle and which houses a comminuting apparatus including a rotary element that comminutes solid material carried away with the waste, a vertical shaft for driving the water circulator and the comminuting element, a valve in the comminuting chamber for controlling the discharge of waste through the outlet, and fly-weights carried round with said shaft, said flyweights actuating the valve to close it against the outlet while the water circulator and the comminuting element are being driven by the shaft.

3. A dish-washing machine comprising a receptacle in which the dishes are washed, a rotary device within the receptacle for circulating water to wash the dishes, a bottom outlet from the receptacle for discharge of waste, a chamber below the dish receptacle which receives waste discharged from the receptacle and which houses comminuting apparatus including a rotary element that comminutes solid material carried away with the waste, a vertical shaft for driving the water circulator and the comminuting element, a disc valve in the chamber co-axially mounted on the shaft for up-and-down sliding movement below the outlet, and flyweights carried round with said shaft and arranged to raise the disc to close the outlet while the water circulator and the comminuting element are being driven by the shaft.

4. A machine as claimed in claim 3 wherein the marginal edge of the disc valve is conical and downwardly divergent and the outlet is correspondingly formed, the fly weights being beneath the disc and radially inwardly of the marginal edge of the disc.

5. A machine according to claim 4 in which the central portion of the disc is domed and the fly weights are mounted on the shaft and partly within the domed portion.

6. A dish-washing machine comprising a receptacle in which the dishes are washed, a rotary device within the receptacle for circulating water to wash the dishes, a bottom outlet from the receptacle for discharge of waste, a chamber below the dish receptacle which receives waste discharged from the receptacle and which houses power-driven apparatus that comminutes solid material carried away with the waste, said comminuting apparatus comprising a ring of teeth and a rotary breaker within the ring of teeth and co-acting therewith, a vertical driving shaft on which the water circulator and the rotary breaker are fixed to turn with the shaft, a disc valve co-axially and slidably mounted on the shaft in the chamber below the outlet, the valve normally being held down by gravity in an open position, and fly weights beneath the disc carried round with said shaft and arranged to raise the disc to close the outlet while the water circulator and rotary breaker are being driven by the shaft, the circumferential marginal portion of the disc valve being conical and downwardly divergent to direct waste from the outlet towards the ring of teeth.

References Cited in the file of this patent

UNITED STATES PATENTS

| | | |
|---|---|---|
| 2,418,366 | Powers | Apr. 1, 1947 |
| 2,517,109 | Hollerith | Aug. 1, 1950 |
| 2,729,219 | Smith | Jan. 3, 1956 |